United States Patent [19]

Felcht et al.

[11] Patent Number: 4,460,766

[45] Date of Patent: Jul. 17, 1984

[54] DISPERSING AUXILIARY FOR PREPARING CELLULOSE ETHERS

[75] Inventors: Utz-Hellmuth Felcht, Schwalbach; Eberhard Perplies, Walluf, both of Fed. Rep. of Germany

[73] Assignee: Hoechst Aktiengesellschaft, Frankfurt am Main, Fed. Rep. of Germany

[21] Appl. No.: 443,104

[22] Filed: Nov. 19, 1982

[30] Foreign Application Priority Data

Nov. 30, 1981 [DE]  Fed. Rep. of Germany ....... 3147434

[51] Int. Cl.³ .................... C08B 11/00; C08B 11/08; C08B 11/145; C08B 11/193
[52] U.S. Cl. ....................................... 536/84; 536/44; 536/43; 536/91; 536/96; 536/98
[58] Field of Search ........................... 536/84, 90–100, 536/44, 43

[56] References Cited

U.S. PATENT DOCUMENTS

| | | | |
|---|---|---|---|
| 2,553,695 | 5/1951 | Wilcox | 536/98 |
| 2,618,632 | 11/1952 | Klug | 536/91 |
| 2,682,535 | 6/1954 | Broderick | 536/85 |
| 2,744,894 | 5/1956 | Benedict | 536/95 |
| 2,749,336 | 6/1956 | Boddicker | 536/98 |
| 2,767,170 | 10/1956 | Graybeal | 536/101 |
| 3,085,087 | 4/1963 | Henry | 536/98 |
| 3,131,177 | 4/1964 | Klug | 536/85 |
| 3,284,441 | 11/1966 | Bishop et al. | 536/98 |
| 3,351,583 | 11/1967 | Bishop | 536/95 |
| 4,024,335 | 5/1976 | Nicholson | 536/95 |
| 4,129,722 | 12/1978 | Iovine et al. | 536/84 |
| 4,137,399 | 1/1979 | Hülsmann et al. | 536/84 |
| 4,278,790 | 7/1981 | McCormick | 536/84 |
| 4,339,573 | 7/1982 | Wüst et al. | 536/84 |

FOREIGN PATENT DOCUMENTS

| | | |
|---|---|---|
| 1009173 | 5/1957 | Fed. Rep. of Germany . |
| 1196628 | 7/1965 | Fed. Rep. of Germany . |
| 2000082 | 7/1971 | Fed. Rep. of Germany . |
| 1543009 | 9/1974 | Fed. Rep. of Germany . |
| 3004161 | 8/1980 | Fed. Rep. of Germany . |
| 2929002 | 2/1981 | Fed. Rep. of Germany . |
| 3010464 | 10/1981 | Fed. Rep. of Germany . |

OTHER PUBLICATIONS

Bulletin de la Société Chimique de France 1968 No. 3, pp. 1205–1210.
McGraw-Hill Encyclopedia of Science and Technology, vol. 12, pp. 553 to 555, 1971.
The Encyclopedia of Chemistry, Second Edition, pp. 397 to 399, 744, 993, 994, Van Nostrand Reinhold Company, 1966.

*Primary Examiner*—Ronald W. Griffin
*Attorney, Agent, or Firm*—Berman, Aisenberg & Platt

[57] ABSTRACT

In modern processes for preparing cellulose ethers containing one or more types of substituents, such as MC, CMC, HEC, HPC, MHEC or EHEC, cellulose is reacted with an etherifying agent in the presence of water, base and at least one inert organic solvent (as a dispersing auxiliary). Dimethoxyethane (ethylene glycol dimethyl ether) is employed as a new organic solvent for these syntheses, particularly in quantities of 1 to 30 parts by weight per part by weight of cellulose.

11 Claims, No Drawings

DISPERSING AUXILIARY FOR PREPARING CELLULOSE ETHERS

TECHNICAL FIELD

The invention relates to a process for the preparation of cellulose ethers in which an inert organic solvent, dimethoxyethane, is employed as a dispersing auxiliary.

BACKGROUND

The preparation of cellulose ethers having uniform or different types of ether substituents is known, for example, from "Ullmanns Encyklopaedie der technischen Chemie" [Ullmann's Encyclopedia of Industrial Chemistry"], Volume 9, keyword "cellulose ethers", Verlag Chemie - Weinheim, 4th edition 1975, pages 192 et seq, these being prepared, in general, either (a) by the principle of Williamson's ether synthesis by reacting cellulose with alkyl or aralkyl halides (with the consumption of a base) and/or (b) and (c) by reacting cellulose with activated reactants (in the presence of catalytic quantities of a base):

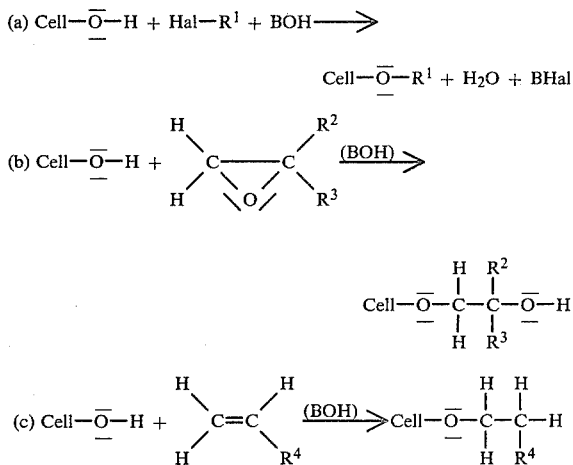

In these general equations:
  Cell—$\overline{O}$-H denotes, on the cellulose molecule, a hydroxyl group which is to be etherified,
  Hal denotes chlorine or bromine,
  $R^1$ denotes an alkyl radical from $C_1$ to $C_{15}$, an aralkyl (the aryl part being phenyl or naphthyl) radical from $C_7$ to $C_{15}$, a carboxyalkyl radical from $C_1$ to $C_3$, a sulfonoalkyl radical from $C_1$ to $C_3$, a phosphonoalkyl radical from $C_1$ to $C_3$, a hydroxyalkyl radical from $C_1$ to $C_6$ or an N,N-dialkylaminoalkyl radical in which each alkyl group is from $C_1$ to $C_3$,
  $R^2$ and $R^3$ denote hydrogen or an alkyl radical from $C_1$ to $C_{13}$, $R^2$ being identical with $R^3$ or different therefrom,
  BOH denotes a base, such as NaOH or a quaternary ammonium base, and
  $R^4$ denotes an optionally N-substituted carboxamide or sulfonamide radical or a nitrile radical.

Mixed ethers of cellulose are also prepared by the simultaneous or stagewise action of various etherifying agents on cellulose. As well as reactions according to only one of the variants a to c indicated, reactions according to at least two of the variants are also carried out when preparing said mixed ethers. The following are examples of reaction products which can be prepared by variant (a): methylcellulose (MC), ethylcellulose (EC), benzylcellulose (BeC), carboxymethylcellulose (CMC), sulfonoethylcellulose (SEC), phosphonomethylcellulose (PMC) or N,N-diethylaminoethylcellulose (DEAEC). The following are examples of reaction products which can be prepared by variant (b): hydroxyethylcellulose (HEC), hydroxybutylcellulose (HBC) or hydroxypropylcellulose (HPC). The following are examples of reaction products which can be prepared by variant (c): sulfonoamidoethylcellulose (SAEC) or cyanoethylcellulose (CNEC). Mixed ethers of cellulose which can be prepared by the same or different variant (s) of those indicated include, for example, methylhydroxyethylcellulose (MHEC), methylhydroxypropylcellulose (MHPC), ethylhydroxyethylcellulose (EHEC), hydroxyethylhydroxypropylcellulose E(HEHPC), methylcarboxymethylcellulose (MCMC), hydroxyethylphosphonomethylcellulose (HEPMC), methylhydroxyethylhydroxypropylcellulose (MHEHPC) or carboxymethylhydroxyethylcellulose (CMHEC). Within the scope of the statements below, the term "cellulose ethers" is to be under-as meaning both products having a unitary substituent, such as hydroxyethylcellulose, and products having at least two different substituents, such as methylcarboxymethylcellulose.

Most of the known processes for the preparation of cellulose ethers are carried out in two main stages:
  1. The preparation of the "alkali cellulose".
  2. The etherification of the cellulose molecule.

In order to prepare the "alkali cellulose", cellulose in a finely divided (for example ground) form is mixed as homogeneously as possible in suitable technical equipment with water and alkali-metal hydroxide (in general NaOH, but other bases, such as quaternary ammonium bases, are also possible). The alkali-metal hydroxide is used in a solid form or in the form of an aqueous solution. For the etherification reaction itself and thus for the quality of the end product of the reaction, the uniformity and intensity of the mixing is of decisive importance (in this connection see, for example, German Offenlegungsschrift No. 2,929,002). The alkalization is generally effected at as low a temperature as possible, for example room temperature or below, in order to suppress degradation of the polymer ("ripening" as it is called); however, under certain circumstances, for example the subsequent preparation of cellulose ethers of low viscosity, this degradation is often desirable. The etherifying agent is optionally added as early as the alkalizing stage, but in this case the temperature must generally be increased further in order to carry out the actual etherification reaction [in this connection see, for example, German Auslegeschrift No. 1,543,009 (=U.S. Pat. No. 3,351,583)].

The actual etherification stage is generally carried out by heating the alkali cellulose produced in the first stage, together with the etherifying agent which has been added meanwhile, to temperatures between 30° and 120° C. In the course of this it is also possible to remove, in advance, part of the water present in the first stage (in this connection see, for example, German Offenlegungsschrift No. 3,010,464). Vigorous mixing in the second stage is also very important for the quality of the reaction product and for the cost-efficiency of the process, since, for example, it is desirable to have a good yield in the substitution reaction while employing as small a quantity as possible of etherifying agent(s).

Both continuous and discontinuous procedures are known for both of the reaction stages. In the case of certain reactants, it is also possible to combine the two stages in such a way that pre-alkalization of the cellulose does not take place. Dispersing auxiliaries (suspending agents) are optionally employed in both of the stages, or at least in one of the two stages, in order to achieve better mixing of the heterogeneous reaction mixture, and organic solvents which are either soluble in water or more or less insoluble in water are known from the state of the art:

TABLE

| Type of organic solvent | Type of cellulose ether | Published in |
|---|---|---|
| Ethylene glycol monoalkyl ethers | MC, EC CMC | U.S. Pat. No. 2,553,695 |
| Ethylene glycol diethyl ether, dioxane, tetrahydrofuran or alkanols ($C_3$ or $C_4$) | CMHEC | U.S. Pat. No. 2,618,632 |
| Mixtures of alkanols ($C_3$ to $C_{10}$) and alkoxyalkanols | HEC, HPC | U.S. Pat. No. 2,682,535 |
| Isopropanol | CMC | U.S. Pat. No. 2.749,336 or U.S. Pat. No. 2,767,170 |
| Mixtures of toluene, heptane, aliphatic monoethers or aliphatic ketones and alkoxyalkanols | HEC | U.S. Pat. No. 2.744,894 |
| A mixture of carbon tetrachloride and ethanol | CMC | U.S. Pat. No. 3,085,087 |
| Acetone or methyl ethyl ketone | HEC | U.S. Pat. No. 3,131,177 |
| A mixture of dimethyl sulfoxide and formaldehyde | HEC, HPC HBC | U.S. Pat. No. 4,024,335 |
| Mixtures of benzene, toluene or xylene and ethanol | CMC | German Auslegeschrift 1,009,173 |
| Alkanols of and above $C_3$, glycols, glycolethers, aliphatic ketones, tetrahydrofuran or dioxane | CNEC | German Auslegeschrift 1,196,628 |
| Mixtures of alkanes (of and above $C_6$), aromatic compounds aliphatic ketones, aliphatic ethers or halogenated alkanes and alkanols ($C_2$ to $C_4$), dimethyl sulfoxide, dioxane or tetrahydrofuran | HPC | German Auslegeschrift 1,543,009 (= U.S. Pat. No. 3,351,583) |
| Alkanols ($C_1$ to $C_5$), toluene or xylene | MHEC, CMC | German Offenlegungsschrift 2.929,002 |
| Isopropanol or a mixture of t-butanol and acetone | MALkC, HEAlkC, HPAlkC (Alk from $C_{10}$ to $C_{24}$) | German offenlegungsschrift 3,004,161 |
| Mixture of alkanes or aromatic compounds from $C_6$ to $C_{12}$ and alkanols ($C_1$ to $C_4$) | MHPC MHEC, CMC | German Offenlegungsschrift 3,010,464 |

However, when used in the preparation of alkali cellulose and/or in the etherification of cellulose, the organic solvents which are known from the state of the art exhibit at least one of the disadvantages listed below:

They can undergo side-reactions with strong bases, for example diacetone alcohol is formed in this way from acetone.

They can be at least partially immiscible with water, so that phase separation then takes place (for example in the case of alkanes, aromatic compounds or aliphatic ethers).

Organic solvents containing hydroxyl groups can compete with the polyhydroxy compound cellulose in reacting with the etherifying agents, so that the yield in the substitution reaction—relative to the cellulose—is reduced (for example in the case of alkanols or alkoxyalkanols).

They can be toxic, so that they are as far as possible no longer employed in up-to-date processes (for example in the case of dimethyl sulfoxide or dioxane).

The boiling point of the organic solvent is higher than that of water so that recovery by distillation—which is necessary in an up-to-date process—is unprofitable, and, in addition, the salts formed as by-products in the etherification then remain in the organic solvent [for example in the case of ethylene glycol diethyl ether which has a boiling point (b.p. $_{760}$) of 123.5° C.].

They can have a tendency to form dangerous by-products (for example in the case of tetrahydrofuran - the formation of peroxides).

SUMMARY OF THE INVENTION

The object of the present invention is, therefore, to find an organic solvent which is suitable as a dispersing auxiliary in syntheses of cellulose ethers and which makes it possible to achieve maximum yields in the substitution reaction under customary process conditions, without side reactions specific to the solvent, while at the same time achieving problem-free handling and working-up.

This object is achieved starting from a process for the preparation of cellulose ethers from cellulose and alkylating agents in the presence of water, base and at least one inert organic solvent. The process according to the invention then comprises employing dimethoxyethane as the inert organic solvent. The invention includes corresponding reaction mixtures for producing such cellulose ethers and which comprise dimethoxyethane as a dispersing auxiliary.

Dimethoxyethane (also known as ethylene glycol dimethyl ether or dimethylglycol) is known from the literature; it is a colorless, non-toxic liquid, miscible in all proportions with water and has a boiling point (b.p. $_{760}$) of 86° C., while its azeotrope with water (9:1) boils at about 80° C.

DETAILS

The process according to the invention is carried out either discontinuously or continuously in conventional equipment for cellulose ether chemistry (for example kneaders, stirred kettles or impeller mixers). If the temperature level of the reaction mixture is selected so that it is higher than the boiling point of the mixture of organic solvent/$H_2O$, it is advisable to carry out the process according to the invention in a pressure apparatus; it is also customary to carry out the reaction in a pressure apparatus if reactants are used which are already in a gaseous state under normal conditions (standard pressure and room temperature), for example if ethylene oxide is used as the etherifying agent. The quantities of components indicated in the following embodiments reflect only the sum of the quantities of the components required for the reaction at the start of the etherification stage; at that time part of the cellulose and the alkalimetal hydroxide is already in the form of alkali cellulose, for example when there is a separate alkalization stage; when, for example, the etherifying agent is introduced into the reaction mixture in the form of acid (for example monochloroacetic acid for the preparation of CMC), additional quantities of base must be employed for neutralization.

The cellulose employed is either of natural origin, for example cotton linters or wood pulp, or is in a regenerated form, such as cellulose hydrate; the particle size of the cellulose before the start of the reaction should, as far as possible, be less than about 2.5 mm, in particular less than about 1 mm, it being possible to achieve this particle size, for example, by grinding cellulose which is supplied in a longer-fibered form to give "powders".

The bases are preferably employed as an alkali-metal hydroxide—usually NaOH, but also KOH or LiOH—in a solid form or in a dissolved form as an aqueous alkali-metal-hydroxide solution (for example in the form of a 20 to 50% strength by weight solution), but it is also possible to use ammonium bases. In the process according to the invention it is preferable to employ about 1 to 30 parts by weight of dimethoxyethane per part by weight of cellulose, particularly preferentially 6 to 18 parts by weight. If alkali-metal hydroxides are employed as bases, the amount thereof is, in general, 0.8 to 12.0 moles, in particular 1.0 to 6.0 moles, per mole of cellulose (calculated on the basis of an anhydro-D-glucose unit). The proportion of water in the reaction mixture is advantageously selected as a figure within the range from 5 to 25 moles per mole of cellulose; or, if the mixture of liquids dimethoxyethane/water is intended to serve as a reference quantity, the proportion of water in the mixture is 3 to 40% by weight. Alkyl chlorides from $C_1$ to $C_3$, alkylene oxides from $C_2$ to $C_4$ and/or chloroalkanoic acids from $C_2$ to $C_4$ or salts thereof, in particular methyl chloride, ethyl chloride, ethylene oxide, propylene oxide and/or monochloroacetic acid or an appropriate salt, are preferably employed as the etherifying agents. However, the reaction is alternatively conducted with 1,2-butylene oxide, monochloropropionic acid, chloroethanesulfonic acid, vinylsulfonic acid, acrylonitrile, chloromethanephosphonic acid, 1-N,N-diethylamino-2-chloroethane or 2,3-epoxypropyltrimethylammonium chloride. The proportion of etherifying agent is usually from 0.05 to 25 moles, in particular from 0.1 to 10 moles, per mole of cellulose.

In carrying out the process according to the invention in practice, it is advantageous first to alkalize the cellulose in a mixture composed of dimethoxyethane, water and an alkalimetal hydroxide (or quaternary ammonium base), after which the etherifying agent is added in the course of one or more stages [depending on the nature of the etherifying agent(s)]. Alkalization without the presence of the dimethoxyethane is also possible, however, the latter then only being added at the etherification stage(s), or the entire quantity of base being added only at the etherification stage(s), which then at the same time constitutes the alkalization stage; i.e. separate alkalization is not necessary in this process variant. In each case the reaction mixtures and reaction vessels are, as is known, optionally flushed with inert gases, such as nitrogen, in order to remove oxygen and thus to achieve high viscosities in the reaction products; it is also possible to add so-called antioxidants (see, for example, German Offenlegungsschrift No. 2,000,082), such as pyrogallol or gallic acid, in order to prevent reduction in the viscosity (depolymerization).

Irrespective of whether they are carried out as a separate alkalization or etherification stage or as a combination of both stages, all the stages are as a rule operated while stirring well. In the separate alkalization stage, the process is usually carried out at room temperature (from 0° to 30° C., in particular from 15° to 30° C.), while the etherification takes place particularly successfully at a temperature between 30° C. and 120° C., in particular at temperatures up to 90° C. When the alkalization and etherification are carried out in one stage, this stage is, e.g., operated at first for some time at room temperature before the temperature is increased to the final level required for the etherification. When the process is carried out without using pressure equipment, it is advisable to operate it below the boiling point of the 90% strength azeotropic mixture of dimethoxyethane/water of about 80° C. When, however, a gaseous etherifying agent (such as ethylene oxide or methyl chloride) is employed, operating under normal pressure is not advantageous. The maximum pressure set up in the reaction vessel corresponds to the sum of the partial pressures of the components in the reaction mixture.

The time required in the etherification stage is generally—depending on the reaction temperature—between 30 minutes and 8 hours. The crude product is first freed from the bulk of the liquid components in a separating device (for example a centrifuge), preferably after adding acid until the unconsumed bases have been neutralized, and it can then, if desired, be subjected to extraction in order to remove adhering salts; finally, it is dried and, if desired, ground, mixed with further components or granulated. These methods of working-up, purification and after-treatment are those which are customary in the chemistry of cellulose ethers and they therefore do not require a detailed description.

The cellulose ethers which are prepared by the process according to the invention are useful in known fields of technology, for example, as thickeners, adhesives, additives in the field of building materials, additives in the field of foodstuffs, or the like.

The use of dimethoxyethane as a dispersing auxiliary in the customary processes for the preparation of cellulose ethers leads, in particular, to the following advantages:

Dimethoxyethane is stable to strong bases, such as aqueous alkali-metal-hydroxide solutions.

It does not react with known etherifying agents.

Its use leads to surprisingly high yields in the substitution reaction.

The boiling point of its azeotrope with water, at about 80° C., permits easy purification of the liquid reactants after the reaction has been carried out and thus permits cost-advantageous recovery and recycling.

EXAMPLES

In the examples which follow, parts by weight are related to parts by volume as kg to $dm^3$; the percentages relate to weight. Unless otherwise specified, the viscosity values indicated were determined in a Hoeppler falling ball viscometer in a 2% strength aqueous solution at 20° C. The "DS" is the degree of substitution, i.e. the average number of substituted OH groups per anhydro-D-glucose unit; in the case of cellulose it is within the range from 0.0 to 3.0. The "MS" is the molar degree of substitution, i.e. the average number of moles of the substituting reagent which have been attached by an ether linkage per mole of anhydro-D-glucose unit; in the case of cellulose it can even be greater than 3.0; it is normally used instead of the DS in order to characterize those substituents on the cellulose ether which can be formed by multiple substitution at an OH group, i.e., for example, in the case of the hydroxyalkyl substituent because the resulting OH groups of the hydroxyalkyl groups can also be substituted—like the OH groups of the cellulose itself.

EXAMPLE 1

50 parts by weight of a chemical pulp (ground to 0.5 mm) were suspended in 425 parts by weight of dimethoxyethane (DME, 8.5 parts by weight per part by weight of cellulose), and a solution of 15.1 parts by weight of NaOH (1.30 moles per mole of cellulose) in 83.4 parts by volume of $H_2O$ (16 moles per mole of cellulose) were added in a kneading unit. The mixture was kneaded for 40 minutes at room temperature, 58 parts by weight of ethylene oxide (4.54 moles per mole of cellulose) were then added, and the etherification mixture was reacted for 60 minutes at 30° C. and for a further 60 minutes at 70° C. After being worked up in a customary manner, an HEC which dissolved to form a clear solution in water and had an MS of 2.52 was obtained at a substitution yield of 57%.

COMPARISON EXAMPLE VI

The reaction was carried out as indicated in Example 1, but using isopropanol instead of DME. An HEC which dissolved in water to form a clear solution and had an MS of 2.26 was obtained at a substitution yield of 50%; i.e. the result of replacing the organic solvent in accordance with the invention was an increase in the substitution yield compared with isopropanol, which is very often used in the preparation of cellulose ethers.

EXAMPLE 2

A solution of 30 parts by weight of NaOH (1.29 moles per mole of cellulose) in 188 parts by volume of $H_2O$ (17.9 moles per mole of cellulose) was added, in a kneading unit, to 100 parts by weight of a chemical pulp (ground to 0.5 mm) in 740 parts by weight of DME (7.4 parts by weight per part by weight of cellulose). The mixture was kneaded for 30 minutes at room temperature, 115 parts by weight of ethylene oxide (4.5 moles per mole of cellulose) were then added, and the etherification mixture was reacted for 60 minutes at 30° C. and for a further 60 minutes at 70° C. After being worked up in a customary manner, an HEC which dissolved in water to form a clear solution and had an MS of 2.87 was obtained at a substitution yield of 64% and with a viscosity of 620 mPas (1.9% strength solution).

EXAMPLE 3

The reaction was carried out as indicated in Example 2, but using 24 parts by weight of NaOH (1.03 moles per mole of cellulose) in 105 parts by volume of $H_2O$ (10.0 moles per mole of cellulose) and 82 parts by weight of ethylene oxide (3.2 moles per mole of cellulose). An HEC which dissolved in water to form a clear solution and had an MS of 2.23 was obtained at a substitution yield of 70% and with a viscosity of 17,000 mPas (1.9% strength solution).

EXAMPLE 4

148.5 parts by weight of DME (7.43 parts by weight per part by weight of cellulose) and 16.5 parts by volume of $H_2O$ were charged to a pressure-resistant forced circulation stirred kettle, 4.8 parts by weight of NaOH (1.03 moles per mole of cellulose), 16 parts by volume of $H_2O$ (a total of 18.1 moles per mole of cellulose) and 1.4 parts by weight of Na monochloroacetate (0.10 mole per mole of cellulose) were then metered in, and the mixture was homogenized for 15 minutes at 20° C. with external cooling. 20 parts by weight of cellulose powder (ground to 0.25 mm) were added and the kettle was closed; a vacuum was applied until a pressure of 0.1 bar (absolute) had been reached, after which 20 parts by weight of ethylene oxide (3.9 moles per mole of cellulose) were metered in, and an excess pressure of 0.2 bar of nitrogen was set up. The mixture was reacted for 30 minutes at 30° C. and for 60 minutes at 70° C. After working up in the customary manner, an HECMC which had a $DS_{CM}$ of 0.08, an $MS_{HE}$ of 2.77 (=71% substitution yield) and a viscosity of 13,000 mPas (1.9% strength solution) was obtained.

EXAMPLE 5

172 parts by weight of a spruce cellulose (ground to 0.5 mm) were mixed, in a kneading unit, with 140 parts by weight of NaOH (3.5 moles per mole of cellulose), 172 parts by volume of $H_2O$ (9.5 moles per mole of cellulose) and 1,548 parts by weight of DME (9.0 parts by weight per part by weight of cellulose) for 45 minutes at 20° to 25° C. The mixture was transferred to an autoclave and, after the latter had been closed, 44 parts by weight of ethylene oxide (1.0 mole per mole of cellulose) and 1,000 parts by weight of methyl chloride (19.8 moles per mole of cellulose) were metered in. The mixture was heated to a temperature of 80° C. in the course of 60 minutes, this temperature was maintained for 60 minutes and the reaction mixture was worked up in a customary manner after discharging the excess methyl chloride. An MHEC which dissolved in water to form a clear solution and had an $MS_{HE}$ of 0.3, a $DS_M$ of 1.78 (=51% substitution yield) and a viscosity of 22,000 mPas was obtained.

EXAMPLE 6

172 parts by weight of a spruce cellulose (ground to 0.5 mm) were mixed in a stirred autoclave with 105 parts by weight of a 50% strength aqueous NaOH solution and 1,720 parts by weight of a mixture of 9 parts of DME/1 part of $H_2O$ (9.0 parts by weight of DME per part by weight of cellulose) for 45 minutes at 20° to 25° C. After adding 66 parts by weight of ethylene oxide (1.5 moles per mole of cellulose), the mixture was warmed to 35° C., kept at this temperature for 30 minutes and then heated at 70° C. for 60 minutes. The reaction mixture was cooled to 20° C., 153.5 parts by weight of a 50% strength aqueous NaOH solution (a total of 3.24 moles of NaOH and 16.7 moles of $H_2O$ per mole of cellulose) were added and the mixture was stirred at 20° C. for 30 minutes while excluding air. The second etherification was carried out by means of 1,250 parts by weight of methyl chloride (24.8 moles per mole of cellulose), the mixture was heated to 80° C. in a period of 60 minutes and was kept at this temperature for a further 60 minutes. After being worked up in a customary manner, an MHEC which dissolved in water to give a clear solution and had an $MS_{HE}$ of 0.87 (=58% substitution yield), a $DS_M$ of 1.60 (=50% substitution yield) and a viscosity of 25,800 mPas was obtained.

EXAMPLE 7

A solution of 80 parts by weight of NaOH (2.0 moles per mole of cellulose) in 132 parts by volume of $H_2O$ (7.3 moles per mole of cellulose) was added dropwise at 20° C. and over a period of 5 minutes to a suspension of 172 parts by weight of a spruce cellulose (ground to 0.5 mm) in 1,800 parts by weight of DME (10.5 parts by weight per part by weight of cellulose) in a stirred autoclave, and the mixture was stirred for 30 minutes at this temperature. After the autoclave had been evacuated, 36 parts by weight of ethylene oxide (0.82 mole per mole of cellulose) and 636 parts by weight of methyl chloride E(12.6 moles per mole of cellulose) were added, and the mixture was heated for 45 minutes at 50° C. and then for 70 minutes at 90° C. After discharging the excess methyl chloride, the mixture was worked up in a customary manner and an MHEC having an $MS_{HE}$ of 0.3 (=38% substitution yield), a $DS_m$ of 1.4 (=70% substitution yield) and a viscosity of 53,000 was obtained.

EXAMPLE 8

A solution of 112 parts by weight of NaOH (2.8 moles per mole of cellulose) in 170 parts by volume of $H_2O$ (9.5 moles per mole of cellulose) was added dropwise at 20° C., and over a period of 5 minutes, to a suspension of 172 parts by weight of a spruce cellulose (ground to 0.5 mm) in 1,530 parts by weight of DME (8.9 parts by weight per part by weight of cellulose) in a stirred autoclave, and the mixture was stirred for 45 minutes at this temperature. 35 parts by weight of propylene oxide (0.6 mole per mole of cellulose) were then added, the mixture was heated to 95° C. over a period of 45 minutes and was kept at this temperature for 60 minutes. After the reaction mixture had been cooled to 30° C., 306 parts by weight of methyl chloride (6.1 moles per mole of cellulose) were added, and the reaction mixture was heated once more to 95° C. and kept at this temperature for 70 minutes. It was worked up in a customary manner, and an MHPC which dissolved in water to form a clear solution and had an $MS_{HP}$ of 0.2 (=33% substitution yield), a $DS_M$ of 1.6 (=57% substitution yield) and a viscosity of 5,000 mPas was obtained.

EXAMPLE 9

49 parts by weight of a 50% strength aqueous NaOH solution (a total of 16.9 moles of $H_2O$ and 1.99 moles of NaOH per mole of cellulose) were metered into a suspension of 53 parts by weight of wood pulp (ground to 0.5 mm) in 690 parts by weight of a mixture of 9 parts of DME/1 part of $H_2O$ in a stirred kettle, and the mixture was stirred for 30 minutes at 20° C. Etherification was carried out by means of a solution of 17.5 parts by weight of monochloroacetic acid (0.6 mole per mole of cellulose) in 17.5 parts by weight of DME (a total of 12.0 parts by weight per part by weight of cellulose), the mixture being heated to 66° C. over a period of 40 minutes and being kept at this temperature for 60 minutes. After cooling and adding 4 parts by weight of a 30% strength aqueous solution of $H_2O_2$, the mixture was worked up in a conventional manner, and an NaCMC which dissolved in water to form a clear solution and had a DS of 0.39 (=65% substitution yield) and a viscosity of 42 mPas was obtained.

EXAMPLE 10

The reaction was carried out as indicated in Example 9, but using 54.2 parts by weight of a 50% strength aqueous NaOH solution (a total of 17.2 moles of $H_2O$ and 2.19 moles of NaOH per mole of cellulose) and 29.1 parts by weight of monochloroacetic acid (1.0 mole per mole of cellulose) in 29 parts by weight of DME (a total of 12.2 parts by weight per part by weight of cellulose) and without adding $H_2O_2$. The obtained NaCMC, which dissolved in water to give a clear solution, had a DS of 0.62 (=62% substitution yield) and a viscosity of 500 mPas.

EXAMPLE 11

The reaction was carried out as indicated in Example 10, but using cotton linters and, after flushing with nitrogen, using 27.1 parts by weight of solid NaOH (i.e. 2.19 moles of NaOH and 12.4 moles of $H_2O$ per mole of cellulose). The NaCMC, which dissolved in water to give a clear solution, had a DS of 0.68 (=68% substitution yield) and a viscosity of more than 50,000 mPas.

EXAMPLE 12

21 parts by weight of a spruce cellulose (ground to 0.5 mm) were suspended in 360 parts by weight of DME (17.2 parts by weight per part by weight of cellulose) in a stirred apparatus, and 39 parts by weight of a 28.2% strength aqueous NaOH solution (2.26 moles of NaOH per mole of cellulose) were added. The mixture was stirred for 45 minutes at room temperature, and 47 parts by weight of a 44.7% strength aqueous solution of diethylaminoethyl chloride-hydrochloride (a total of 24.6 moles of $H_2O$ and 1.0 mole of DEAECl-HCl per mole of cellulose) were then added. The reaction mixture was warmed to 55° C. to 60° C. and was kept at this temperature for 120 minutes. The mixture was worked up in a customary manner and a DEAEC which dissolved in water to give a clear solution and had a DS of 0.42 (=42% substitution yield) was obtained.

COMPARISON EXAMPLE V2

The reaction was carried out as indicated in Example 12, but using the same quantity by weight of acetone instead of DME. The DEAEC obtained had a DS of 0.37 (=37% substitution yield) and a reduced solubility in water.

COMPARISON EXAMPLE V3

The reaction was carried out as indicated in Example 12, but using the same quantity by weight of t-butanol instead of DME. The DEAEC obtained had a DS of 0.17 (=17% substitution yield) and was insoluble in water.

COMPARISON EXAMPLE V4

The reaction was carried out as indicated in Example 12, but using the same quantity by weight of isopropanol instead of DME. The DEAEC obtained had a DS of 0.04 (=4% substitution yield) and was insoluble in water.

The invention and its advantages are readily understood from the preceding description. Various changes can be made in the processes, reactants and reaction mixtures without departing from the spirit and scope of the invention or sacrificing its material advantages. The processes, reactants and compositions hereinbefore described are merely illustrative of preferred embodiments of the invention.

What is claimed is:

1. A process for producing a cellulose ether from cellulose and etherifying agent in a reaction mixture containing water, base and at least one organic solvent, the organic solvent comprising from 1 to 30 parts by weight of dimethoxyethane per part by weight of cellulose in the reaction mixture.

2. A process according to claim 1 which comprises two sequential stages:
    (a) an alkalization stage and (b) an etherification stage.

3. A process according to claim 2 wherein a reaction mixture in the alkalization stage comprises dimethoxyethane.

4. A process according to claim 2 wherein a reaction mixture in the etherification stage comprises dimethoxyethane.

5. A process according to claim 2 wherein dimethoxyethane is employed subsequent to stage (a).

6. A process according to claim 1 wherein the etherifying agent is a $C_1$ to $C_3$ alkyl chloride, a $C_2$ to $C_4$ alkylene oxide, a $C_2$ to $C_4$ chloroalkanoic acid, a $C_2$ to $C_4$ choroalkanoic acid salt or a combination of at least two such agents.

7. A process according to claim 1 wherein the organic solvent consists essentially of dimethoxyethane.

8. In a reaction medium for producing cellulose ether and containing cellulose, base, water and organic solvent, the improvement wherein the organic solvent comprises from 1 to 30 parts by weight of dimethoxyethane per part by weight of cellulose.

9. A reaction medium according to claim 8 which further comprises etherifying agent.

10. A reaction medium according to claim 8 wherein the organic solvent consists essentially of dimethoxyethane.

11. A reaction medium according to claim 10 which further comprises etherifying agent.

* * * * *